United States Patent
Lee et al.

(10) Patent No.: US 12,481,589 B2
(45) Date of Patent: *Nov. 25, 2025

(54) HORIZONTAL SCALING OF VERSION CACHES IN A DISTRIBUTED HIGH-CONCURRENCY MULTI-USER ENVIRONMENT

(71) Applicant: WORKDAY, INC., Pleasanton, CA (US)

(72) Inventors: Darren Lee, Sunnyvale, CA (US); Christof Bornhoevd, Belmont, CA (US)

(73) Assignee: WORKDAY, INC., Pleasanton, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/522,430

(22) Filed: Nov. 29, 2023

(65) Prior Publication Data
US 2024/0095167 A1    Mar. 21, 2024

Related U.S. Application Data

(63) Continuation of application No. 17/587,047, filed on Jan. 28, 2022, now Pat. No. 11,868,255.

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC .. G06F 12/0802; G06F 2212/60; G06F 3/065; G06F 3/0683; G06F 11/1446; G06F 11/1471
See application file for complete search history.

(56) References Cited

U.S. PATENT DOCUMENTS 8,572,038 B2 * 10/2013 Erofeev ............. G06F 11/1435
                                                        707/634

* cited by examiner

*Primary Examiner* — Shawn X Gu
(74) *Attorney, Agent, or Firm* — James J. DeCarlo; Greenberg Traurig, LLP

(57) ABSTRACT

Techniques for providing horizontally scaled caching of versioned data are provided. In some aspects, the techniques described herein relate to a method including initializing a first version cache (VC) object based on a version of data stored in a data storage device; replicating the first VC to generate a second VC; receiving a write operation at the first VC; generating a delta for the write operation, the delta representing a change in the version of data; writing the delta to a persistent replication log, the persistent replication log storing an ordered set of deltas including the delta; writing data in the write operation to the data storage device; and applying the ordered set of deltas at the second VC to update data stored by the second VC.

20 Claims, 6 Drawing Sheets

HORIZONTAL SCALING OF VERSION CACHES IN A DISTRIBUTED HIGH-CONCURRENCY MULTI-USER ENVIRONMENT

CROSS-REFERENCE TO RELATED APPLICATIONS

This application is a continuation of, and claims the benefit of, U.S. application Ser. No. 17/587,047, filed Jan. 28, 2022 and incorporated by reference in its entirety.

BACKGROUND

The example embodiments are directed toward the field of caching and, in particular, to techniques for horizontally scaling version caches in a distributed multi-user environment in terms of concurrent user operations.

Network applications frequently allow multiple users to simultaneously read and write to a data set. In some such applications, processing can be improved by caching the data set in a lightweight storage device "closer" (in terms of latency) to the application logic. However, in such network applications, the consistency of the cached data must be ensured. Often, techniques to ensure all users view the "same" data result in a reduction in computing performance to ensure consistency. The example embodiments remedy these and other issues with caching data sets operated upon by multiple concurrent readers and writers.

DETAILED DESCRIPTION

The example embodiments describe a multi-user network application that operates on a versioned data set. In the various embodiments, one or more VC objects are instantiated for each version of the set being operated on. Read and write operations are all performed on the fast cached version of the data set stored in the VC. Further, the system can horizontally scale VCs for a given version based on demand levels. All writes to a VC (i.e., local writes) are synchronized with a persistent replication log and an underlying canonical data store. A given VC synchronizes its state using the persistent replication log and performs conflict resolution to ensure all VCs are synchronized within a given time interval.

Figure 1:
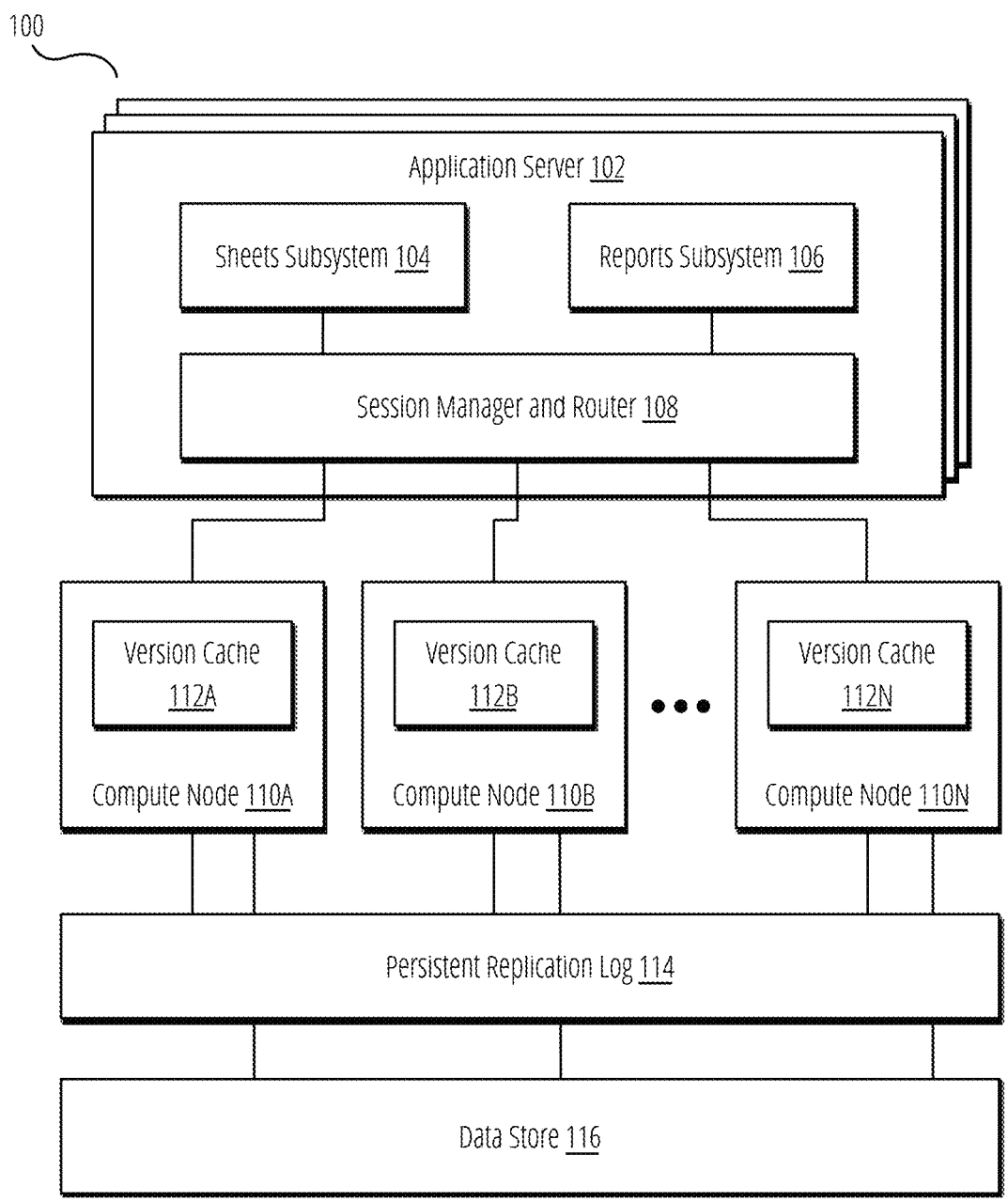
FIG. 1 is a block diagram illustrating a system for providing a network application to a plurality of users according to some of the example embodiments.

FIG. 1 is a block diagram illustrating a system for providing a network application to a plurality of users according to some of the example embodiments.

In an embodiment, a system 100 includes an application server 102, one or more compute nodes (e.g., compute node 110A, compute node 110B, compute node 110N, etc.), a persistent replication log (PRL 114), and a persistent data store 116.

In an embodiment, system 100 can include multiple application servers. In an embodiment, an application server can include a physical or virtual computing device configured with application software or other core logic to perform functions in response to incoming network requests. As such, a given application server includes a real or virtual network interface card (NIC) to receive network requests from client devices (not illustrated), generate response data, and transmit response data to the client devices. In some embodiments, the application servers can only include temporary storage and may rely on a storage layer for a persistent data store. In this manner, the application servers can be scaled based on the number of incoming end-user requests from client devices.

Application server 102 provides one example of an active application server. In an embodiment, the application server 102 includes a sheets subsystem 104 and reports subsystem 106. In some embodiments, these two subsystems can process tabular data, although the disclosure is not limited as such. For example, the data can be represented (in one manner) using a spreadsheet or workbook paradigm. One example of tabular data is numerical data that can be entered (i.e., written) by users and viewed (i.e., read) by the user or other users.

In some embodiments, the sheets subsystem 104 allows for the reading and writing of data stored in the spreadsheet paradigm (and ultimately stored in a persistent data store). For example, sheets subsystem 104 can provide a web-based spreadsheet editor that allows users to input, modify, and delete data in a row/column format. Further, in some embodiments, the sheets subsystem 104 can provide a programming interface allowing users to enter arbitrary computational expressions operating on the data. For example, users can enter (as cell inputs) formulas referencing other cells (which may contain either primitive values or formulas). In some embodiments, the sheets subsystem 104 can also provide for scripting or other types of full-featured programming that operates on the data.

In some embodiments, the reports subsystem 106 generally operates in a read-only mode. Specifically, in some embodiments, the reports subsystem 106 can process data entered via the sheets subsystem 104 and generate reports or other summary data based on the data. For example, if the sheets subsystem 104 allows for the input of financial transactions or other types of data, the reports subsystem 106 can generate graphs, aggregates, or other types of presentational or derived data from the underlying data.

In an embodiment, the application server 102 receives network requests from client devices and routes the requests to either sheets subsystem 104 or reports subsystem 106 (or other subsystems, as implemented). Both sheets subsystem 104 and reports subsystem 106 (and other subsystems) access underlying data via a session manager and router (SMR 108). In an embodiment, the SMR 108 is responsible for analyzing the data access request and routing the request to an appropriate compute node (e.g., compute node 110A, compute node 110B, or compute node 110N). In some embodiments, the SMR 108 can further be configured to manage the state of all compute nodes (e.g., adding, removing, reallocating compute nodes). In some embodiments, the SMR 108 can be part of the application server 102 (e.g., implemented as a linked library or similar imported codebase). In other embodiments, the SMR 108 can be implemented as a standalone physical or virtual computing device (e.g., in a cloud computing availability zone).

In some embodiments, the SMR 108 is configured to maintain affinities between users and compute nodes. As will be discussed, system 100 can ensure that a user sees both snapshot semantics and not older data after seeing newer data. In some embodiments, the SMR 108 can aid this goal by maintaining an affinity between a given user, version, and compute node. That is, once a given user is routed to a given compute node for a given version, the SMR 108 can continue to route that user to that same compute node in the near future (e.g., during the same user session). In this way, even though the different compute nodes may see writes in different orders, a given user will observe the writes in the same order for the given version. In some embodiments, this affinity can be paused when a new VC replica is created (as discussed in FIG. 4B). Since such a replication operation instantiates a new VC on a compute node that doesn't already host that version and the instantiation of a new VC reads the latest changes from the data store 116, the replication operation maintains consistency semantics, and the user will always see the same data or newer data.

While maintaining affinities between users and compute nodes ensures consistency, it is possible for the number of users to be unevenly distributed among the compute nodes if users with an affinity for some compute nodes happen to be using the system for longer periods of time than users with an affinity for other compute nodes. To remedy this, an affinity timeout value can be set. In brief, the affinity timeout value comprises an idle timeout such that if the association between a user and a VC on some compute node is idle for some amount of time, the system can forget the association. Using this time, a user assigned to some compute node sees a version of the data that might be at a different point in time than the version of data on some other compute node. If the user is idle for a long time, the system can take the opportunity to route them to a new compute node to keep the system as balanced as possible. In some embodiments, the system performs this operation so there is no possibility that they will see an older view of the data since the system can prevent any compute node from falling too far behind. In some embodiments, the idle timeout should be configured to be larger than a preconfigured time that ensure that no compute node falls behind by a set duration. After the affinity timeout value, the user-to-compute node affinity is removed, and the user is re-assigned to a compute node-based on the load of the system.

In an embodiment, system 100 includes one or more compute nodes (e.g., compute node 110A, compute node 110B, or compute node 110N). In an embodiment, the compute nodes are functionally identical and are described as such. However, each compute node may perform its functions on different underlying datasets. In some embodiments, a given compute node can comprise a virtual computing device (e.g., virtual machine instance, container, etc.) that can be orchestrated programmatically. As such, multiple compute nodes may reside (in isolation) on a single physical computing device, or a single compute node can occupy its own physical computing device. In some embodiments, system 100 can further include an orchestrator or similar component (not illustrated) that can manage the lifecycle of virtual machines and/or containers in system 100, including compute nodes.

In the example embodiments, system 100 also includes a data store 116. The data store 116 can comprise a database or similar canonical source of data for system 100. In an embodiment, the data stored in data store 116 can be versioned. In some embodiments, the data stored in data store 116 can be logically viewed according to rolling forecasting windows. For example, the data stored in data store 116 can be continuously updated but can be versioned at specific intervals (e.g., every week or month). In this manner, at the specific interval, the current state of the data is saved as a version of the data stored in data store 116, and future updates will be saved in the next version. In some embodiments, a given version can be created by copying the previous version of the data stored in data store 116 and making changes specific to the new period. In some embodiments, operations on the data stored in data store 116 are associated with a given version. Thus, a read specifies the data to read and a version, while a write specifies the data to write (and address) and a version. In this manner, the network application can handle reads and writes for different versions of the data stored in data store 116 at the same time. For example, one user may be reading data from a previous month's version of the data, while a second user may be writing data to the current version of the data. The second user's writing necessarily does not modify the first user's version of the data.

In the illustrated embodiment, a given compute node runs one or more VC objects. For example, compute node 110A runs VC 112A, compute node 110B runs VC 112B, compute node 110N runs VC 112N, etc. In some embodiments, a given VC stores versions of the data. A VC can comprise a data structure that stores the model of the data (e.g., a schema or similar structure) as well as the underlying data of the version of the data. In general, a VC can be computationally expensive to build since the time required to load the version data from a database, and the amount of memory required to store the version are both high. Thus, in some embodiments, all users operating on a given version share the same VC, thus only requiring the VC to be created once. Thus, a given VC can be configured to handle requests from multiple concurrent users at the same time. In some embodiments, read operations can be fulfilled using the VC. In some embodiments, write operations can be fulfilled by first writing to the VC, then to the underlying data store (e.g., database). In some embodiments, write operations are atomic.

Operations on any VC can be either read operations in that they obtain information from the VC but don't change the state of the VC or write operations in that they change the state of the VC. For example, a user generating the data for a financial report would be doing a read operation, while some user changing the value of some input would be doing a write operation. Write operations change the overall state of the system. A write operation is implemented such that it changes the underlying data in the database and changes the internal state of the VC accordingly. From the perspective of a planning user using the application, changing data is an atomic operation in that it either completely succeeds or completely fails, and a successful write operation is immediately visible to the user who made the write operation.

In system 100, read operations and write operations may happen very frequently, yet it is of paramount importance that the data be internally consistent. This means that any operation that operates on data must see the same view of that data for the entire lifetime of the operation. For example, a report running ten seconds that reads and aggregates data from the VC must see the same state of the data throughout the operation. If the report reads a location at time $t_i$ and sees value X but then reads the same location at some later time $t_j$ and sees value Y, that is a violation of snapshot consistency.

To support multiple concurrent users, a given VC can employ an algorithm to ensure consistency of data. One such algorithm is a multiple reader, single writer (MRSW) algorithm. One implementation of snapshot consistency utilizes a rule in which multiple read operations can be serviced in parallel, but no read operations or other write operations are allowed when a write operation is ongoing. To implement an MRSW algorithm, a given VC can use locking or other synchronization primitives to ensure that so long as no writer is present, any number of read operations are allowed. When a write operation is initiated, the VC blocks the write operation until all the read operations are completed. The VC, in turn, blocks read operations until the write operation is complete. For an MRSW implementation to be efficient with a large number of writers, the write lock hold time must be very short. In some embodiments, access to the VC is guarded by an MRSW lock, as is discussed in FIG. 3.

As described previously, SMR 108 or another computing device can manage the lifecycle of a given VC and compute node. In some embodiments, the SMR 108 can maintain various data structures for associating users, organizations, versions, and compute nodes, as is discussed herein. In some embodiments, the compute nodes can be managed by the SMR 108 using horizontal scaling. Horizontal scaling of VCs is a technique in which a VC associated with some version is duplicated (replicated) on multiple compute nodes. The reason this is done is to reduce the number of readers and writers accessing any particular VC and thus reduce the amount of time waiting for access. If a given VC has 300 active users, horizontally scaling the VC across three compute nodes should reduce the number of active users to roughly 100 for any particular VC. For any given version of data, there can be one or more VCs associated with that version in the memory of some compute node (e.g., a compute node). When a user runs some operation on behalf of a given version, the SMR 108 routes the request to a compute node that stores the VC associated with the version. If no compute node is found that has the associated VC in memory, a new compute node is selected or created, and the SMR 108 will cause a VC for the requested version to be instantiated. The SMR 108 will send subsequent requests for the version to this compute node. FIGS. 2 and 4A-4C provide example operations performed by the SMR 108 and are not repeated herein.

System 100 further includes a PRL 114 that stores deltas of write operations performed by the compute nodes. In general, since a given compute node stores a VC that holds a version of data, a given compute node can perform read and write operations solely using the locally stored data. However, if two compute nodes store two VCs for the same version, write operations will not be consistent across the compute nodes. That is, if a first user writes data to a first VC and a second user writes data to a second VC, the users will not see the corresponding writes. To remedy this problem, a given compute node generates a delta for each write operation and persists this delta to the PRL 114. In some embodiments, each delta is assigned a sequence number that allows for replaying write operations. Thus, any compute node can obtain all writes performed by other compute nodes on the same version and can replay these writes (with conflict detection) to bring its VC in sync with the data in data store 116. In some embodiments, each compute node is configured to persist its write to the data store 116 to ensure a canonical record of all writes and a consistent state of data.

The foregoing components are described more fully in connection with the following flow diagrams, which are incorporated herein in their entirety.

Figure 2:
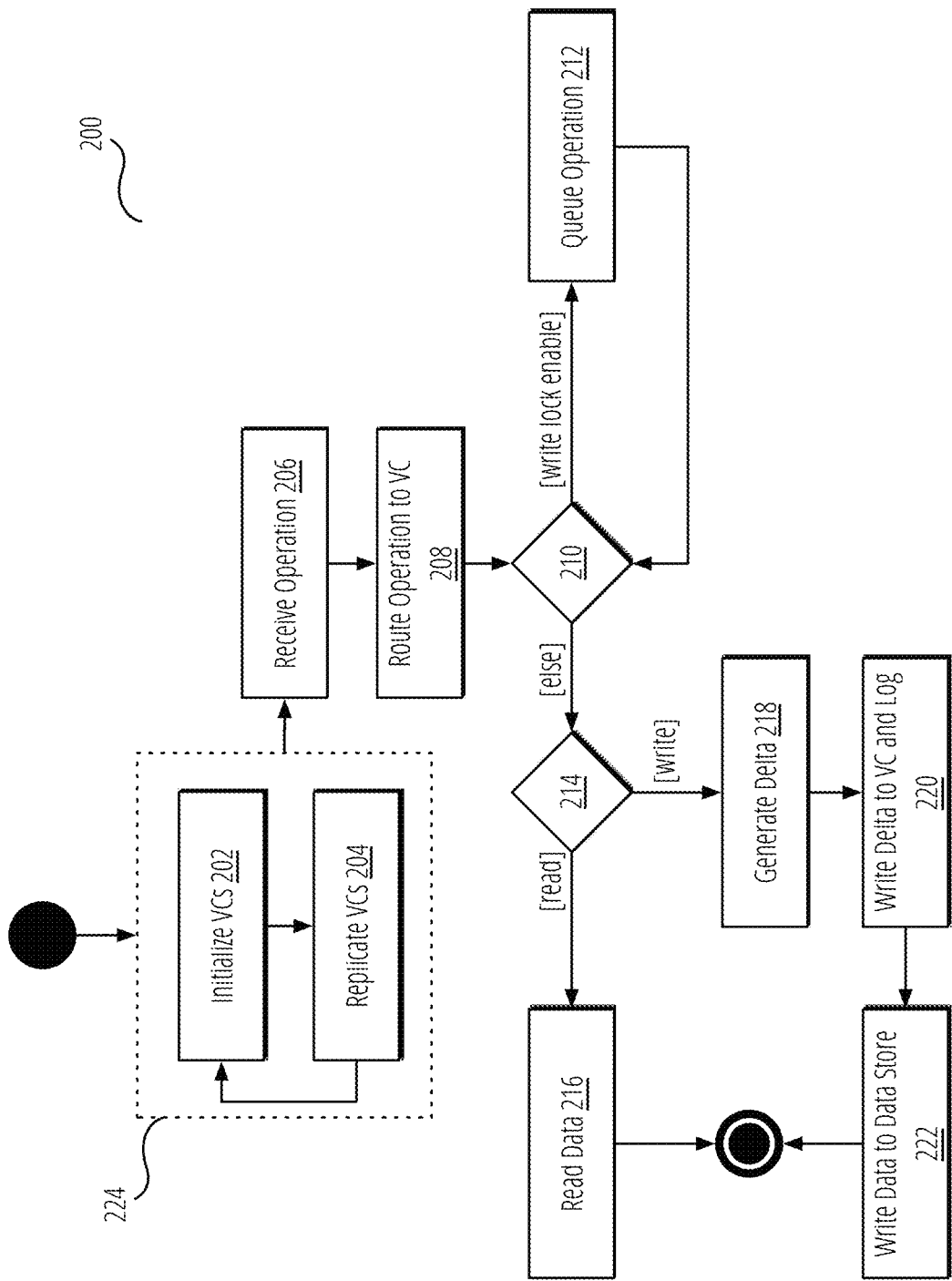
FIG. 2 is a flow diagram illustrating a method for processing read and write operations in a network application according to some of the example embodiments.

FIG. 2 is a flow diagram illustrating a method for processing read and write operations in a network application according to some of the example embodiments.

In some embodiments, method 200 can execute a scaling process 224 to manage one or more VCs. In an embodiment, the scaling process 224 can include an initialization step 202 where method 200 initializes a VC for a given version of data stored in a database. In some embodiments, scaling process 224 can further include a replication step 204 where the method 200 can replicate a given VC in response to network demands. As described, a VC refers to a data structure storing data for a given version of data. In the illustrated embodiment, instantiating and replicating VCs includes allocating physical and/or virtual resources in a cloud environment to store the VC and associated logic for accessing the VCs (described herein). Various techniques for managing the lifecycle of a VC are described in FIGS. 4A through 4C and not repeated herein. In some embodiments, scaling process 224 is executed asynchronously as a background process and thus can be continuously executing while method 200 performs subsequent steps illustrated in FIG. 2.

In step 206, method 200 can include receiving an operation. In an embodiment, the operation can include a read or write operation. In an embodiment, the operation can include a location to read from or write to. In some embodiments, the operation can include a set of filters or other conditions to identify where to read or write data from. In some embodiments, the operation can include a user identifier, organization identifier, or other identification or authorization information. In some embodiments, the operation can further include a version, the version specifying which version of data to perform the operation on. As described above, a given dataset can include one or more versions, and thus operations can be executed on any such version.

In step 208, method 200 can include routing the operation to a VC. In an embodiment, each VC is associated with a given version of data. As such, in step 208, method 200 can analyze the version included in the operation and identify a VC that stores the version of data needed by the operation. In some embodiments, method 200 can store a table managing all VCs deployed in the system. In such embodiments, step 208 can include determining if any VCs in the table match the requested version. If so, method 200 can include selecting an optimal VC. In some embodiments, an optimal VC can comprise a VC experiencing the least load. Other techniques (e.g., round-robin) can be used to select from VCs storing the same version of data. In some embodiments, step 208 can also include scaling up or down VCs, as described in more detail in FIGS. 4A through 4C. Briefly, if method 200 determines that no VCs store the requested version of data, method 200 can include instantiating a new VC for the requested version. Further, step 208 can also include determining if a replica of an existing VC should be created based on, for example, the number of writes occurring on the version of data stored by existing VCs. In this embodiment, method 200 can maintain a number of write operations. In some embodiments, this amount can be a total number of writes for each VC. In other embodiments, the amount can be the total number of pending writes for each VC. In some embodiments, method 200 can manage write counts by analyzing issued write operations and received write responses.

In step 210, method 200 can include determining if a write lock is enabled. In some embodiments, step 210 (and subsequent steps) can be performed by a given compute node storing a VC. Details of granting a lock are provided in FIG. 3 and not repeated herein. In brief, a given compute node can determine if a synchronization lock has been granted due to, for example, a pending write operation. If so, method 200 can queue the received operation in step 212. Once the lock is released, method 200 can determine in step 210 to proceed to process the operation.

In step 214, method 200 can include classifying the operation as a read or a write and executing the operation accordingly. For read operations, method 200 can include reading the requested data from the VC in step 216 and returning the data to the requestor.

For write operations, method 200 can include additional steps. First, in step 218, method 200 can include generating a delta for the write operation. In an embodiment, a delta refers to a data structure or object that describes a change to the VC. In an embodiment, the delta can include the data to write, a version identifier, and a sequence number. In some embodiments, sequence numbers can be generated by a data store (e.g., data store 116) or other central storage mechanism to ensure global ordering of operations.

In step 220, method 200 can include writing the data to write to the VC and writing the delta to a PRL. In some embodiments, the PRL can comprise a reliable data structure to store sequential data. For example, the PRL can comprise a message queue or similar type of data structure. In some embodiments, the PRL stores data out of order; however, in other embodiments, the PRL can be configured to order deltas based on the sequence number.

In step 222, method 200 can include writing the data to write to the data store (e.g., data store 116). In some embodiments, between step 220 and step 222, method 200 can include returning a response to the requestor indicating the write was successful. As illustrated, method 200 writes the data in a write operation twice: once to the VC and then to the canonical data store.

Various operations performed above are described in more detail with regard to the following figures, which are incorporated herein in their entirety.

Figure 3:
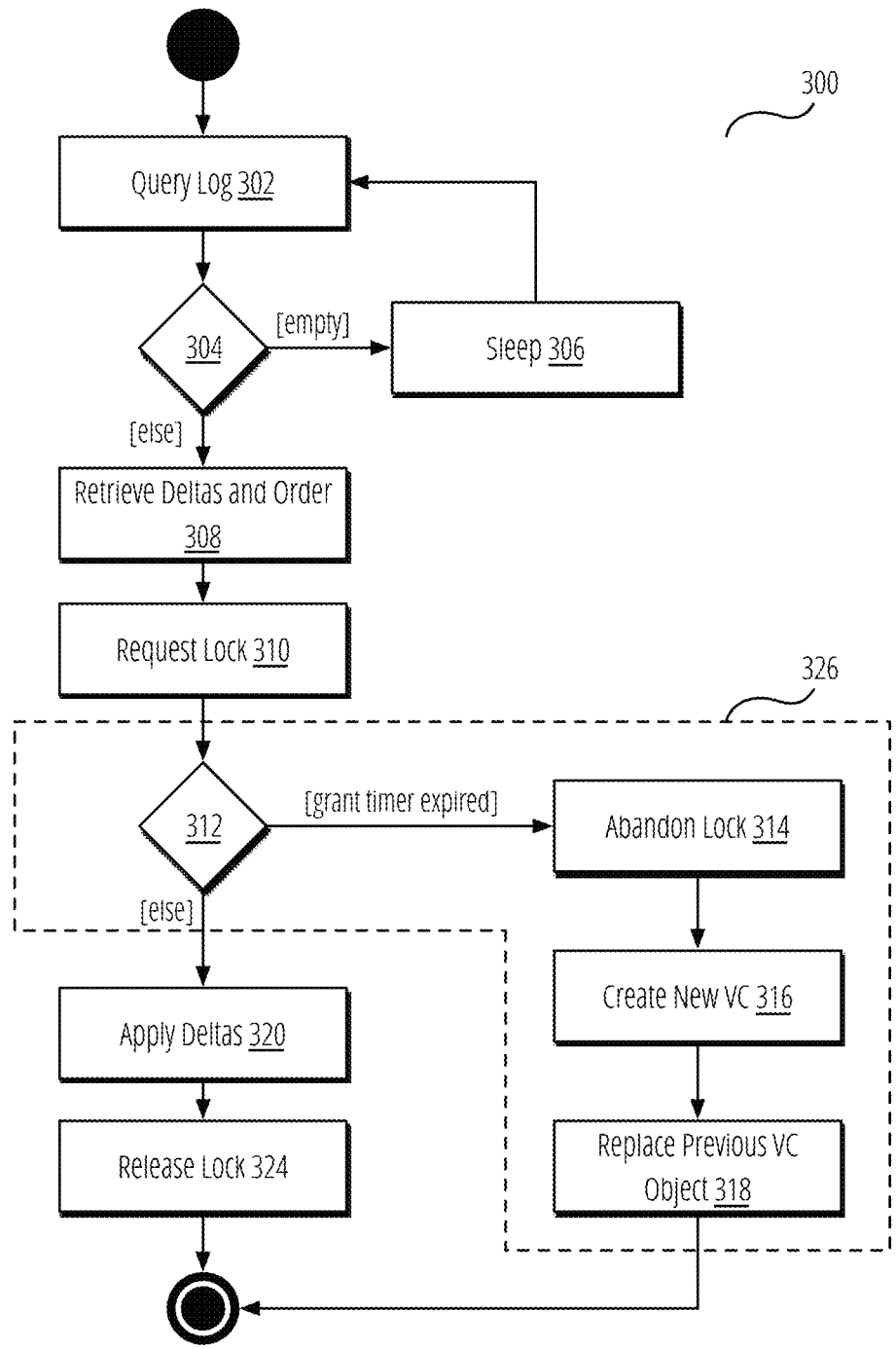
FIG. 3 is a flow diagram illustrating a method for synchronizing a version cache according to some of the example embodiments.

FIG. 3 is a flow diagram illustrating a method for synchronizing a version cache according to some of the example embodiments. In the illustrated embodiments, method 300 can be performed by a compute node such as compute node 110A, compute node 110B, compute node 110N, etc.

In step 302, method 300 can include querying a log. In some embodiments, the log can comprise an RPL, as described previously. In brief, the log can include one or more data structures representing one or more write operations performed by another compute node on a local VC. That is, in some embodiments, step 302 can include a compute node querying the log to obtain a list of write operations performed by other compute nodes. In some embodiments, the log can store write operations as deltas, as described previously.

In step 304, method 300 can include determining if any writes are present in the log. In some embodiments, if no writes have been performed, the log may be empty. As such, method 300 can proceed to step 306. In step 306, method 300 can sleep for a predefined duration. In some embodiments, the duration can comprise a short duration. In some embodiments, the short duration can be one minute, although the example embodiments are not limited as such. As such, step 302, step 304, and step 306 comprise a loop that continuously runs until at least one write is present in the log. In some embodiments, the timer used in step 306 can be adjustable either manually or dynamically. For example, the timer can incrementally increase in duration when no writes are continuously not detected. Once a write is detected in the log, method 300 proceeds to step 308 to process the writes.

In step 308, method 300 retrieves one or more deltas from the log and orders the one or more deltas. In an embodiment, the one or more deltas are associated with write operations performed by other compute nodes in the system. In an embodiment, step 308 can include providing a version identifier to the log and receiving a set of deltas associated with the version identifier. In some embodiments, the delta can include data written, the version identifier, and a sequence number. In some embodiments, the deltas retrieved in step 308 include all deltas occurring after the current time. In other embodiments, the deltas can comprise a set of deltas occurring since the last read of the log. In some embodiments, step 308 can include ordering the deltas based on a sort key. For example, method 300 can sort the deltas based on a sequence number associated with the delta. In other embodiments, if the deltas are associated with timestamps, the timestamps can be used as a sort key.

In some embodiments, the synchronization process for a given compute node and a given VC includes replaying write operations that happen on other compute nodes for the same version of a data set. Generally, a given compute node cannot reasonably apply writes immediately after such writes are performed by other compute nodes. Specifically, such an approach would do little to speed up the performance of the compute node receiving the writes since, although read operations have been reduced on the compute node as reads are distributed across the N compute nodes hosting the same VC, every write operation that happens across the N compute nodes is also soon after happening on this compute node. Another way of saying this is that for N compute nodes and R read operations and W write operations: a single compute node in a non-horizontal scale-out configuration would service R read operations, and W write operations and a single compute node in a horizontal scale-out configuration of N compute nodes would service: R/N read operations and W write operations. However, by utilizing an MRSW algorithm to guarantee snapshot consistency, the presence of writes limits the overall performance of the system, and reducing write operations as much as possible increases the performance of the system.

To achieve this, method 300 introduces latency to when writes are applied to allow the number of writes to build up. In this way, instead of applying each write as it occurs, method 300 sleeps in step 306 and applies the writes in a batch. Since the operations that require a write lock are short and the time to acquire the write lock is usually long in comparison (at least in a busy system), the cost of acquiring a write lock and then doing K write operations is not much more than the cost of acquiring the write lock and doing a single operation. Thus, by batching the write requests and performing K writes at a time instead of one write at a time, method 300 can reduce the workload for a single compute node to R/N read operations and W/N+W/K write operations. In practice, the value of K can vary between ten and fifty. Thus, using method 300, a single compute node in a horizontal scale-out configuration of N compute nodes would service: R/N read operations and W/N+W/K write operations in which K can average between ten and fifty.

In step 310, method 300 can include requesting a lock. In an embodiment, the lock can comprise a write lock. In some embodiments, the lock blocks all operations from operating on the VC while the lock is enabled. That is, all read and write operations are buffered and not allowed to access the VC while the lock is granted. In this manner, writes in the log can be given exclusive access to the VC.

In some embodiments, after requesting a lock, method 300 can execute subprocess 326. In brief, by using a sleep timer of T minutes (or another unit) duration in step 306, method 300 can theoretically ensure that any given compute node executing method 300 will only fall behind other compute nodes by T minutes. However, in practice, the time required to grant the lock requested in step 310 can be an indefinite amount of time. In a busy system, the time to wait for a write lock may vary between zero and a few seconds, however very long read requests may cause the wait time to become thirty seconds or more. To ensure a fixed amount of time in which no compute node executing method 300 will deviate from the others, subprocess 326 can be implemented. However, in some embodiments, subprocess 326 is optional (e.g., if the average lock granting time is minimal). If subprocess 326 is not implemented, method 300 can proceed directly to step 320. However, if subprocess 326 is implemented, method 300 can proceed to step 312.

In step 312, method 300 can include determining if a grant timer has expired. In some embodiments, after requesting the lock in step 310, method 300 can set a timer having a fixed duration to countdown. In some embodiments, the timer may be less than one minute, however, the specific duration (G) is not limiting. In step 312, method 300 can further include determining if the lock is granted before the timer expires. If so, method 300 proceeds to step 320. However, if method 300 determines that the timer has expired and the lock has not yet been granted, method 300 can proceed to step 314.

In step 314, method 300 can include abandoning the lock. In some embodiments, step 314 can include explicitly rescinding the request for a lock. In some embodiments, requests for locks can be queued in a request pool and step 314 can include removing the request from the pool. In other embodiments, method 300 can request can include the timer value as a timeout parameter of the call to request a lock, allowing the operating system or another library to manage the timer.

In step 316, after method 300 abandons the lock, method 300 can include creating a new VC. In some embodiments, step 316 can include replicating the VC operated by the compute node executing method 300. That is, in some embodiments, step 316 can comprise a compute node its VC in a new compute node. In some embodiments, step 316 can comprise the compute node executing method 300 to issue a request to an orchestrator to instantiate a new VC. In some embodiments, when the orchestrator instantiates a new VC, the VC will include the latest canonical version data associated with the version stored in the current VC. As such, the new, instantiated VC will be immediately up to date. Notably, since all writes are persisted to the data store, and new VCs are built from the data store, all new VCs are guaranteed to be up to date as of instantiation time.

In step 318, method 300 can include replacing the current VC with the new VC instantiated in step 316. In some embodiments, step 318 can comprise instructing an orchestrator to launch the new compute node including the new VC. In some embodiments, step 318 can also include instructing the SMR to update the routing table to replace the compute node, and VC executing method 300 with the new compute node and VC instantiated in step 316, such that future requests use the new instantiated compute node and VC. In some embodiments, step 318 can further include instructing the orchestrator to terminate the compute node executing method 300 once the new compute node is instantiated. Further, subprocess 326 can ensure that any given compute node will fall no greater than T+G behind other compute nodes.

If subprocess 326 is not implemented, method 300 will await the granting of a lock-in step 310. Once the lock is granted, method 300 proceeds to step 320.

In step 320, method 300 applies the deltas to VC. As described, a delta can include data to write (as well as any addressing data) and corresponding sequence numbers. Thus, in step 320, method 300 can iterate through each write (in sequential order) and update the VC based on the write operations in the deltas. In some embodiments, method 300 executes the writes one by one.

In step 324, after all writes in the deltas have been executed, method 300 can include releasing the lock. In some embodiments, releasing the lock may require a system or library call to remove the lock. Once removed, the compute node executing method 300 can continue processing read and write operations as normal.

In the illustrated embodiment, method 300 maintains snapshot consistency via an MRSW algorithm, although the disclosure is not limited as such, and other algorithms may be used. Writes that happen on other compute nodes are replayed by method 300 so that the compute node executing method 300 remains synced with the state of the overall system (i.e., is eventual consistent across all replicas). As illustrated, this is done via a synchronization process in which a write lock is obtained, and all the recent writes on other compute nodes are applied by method 300. To the user of the system, method 300 can provide snapshot consistency and eventually reflect the overall state of the system to the user.

Figure 4A:
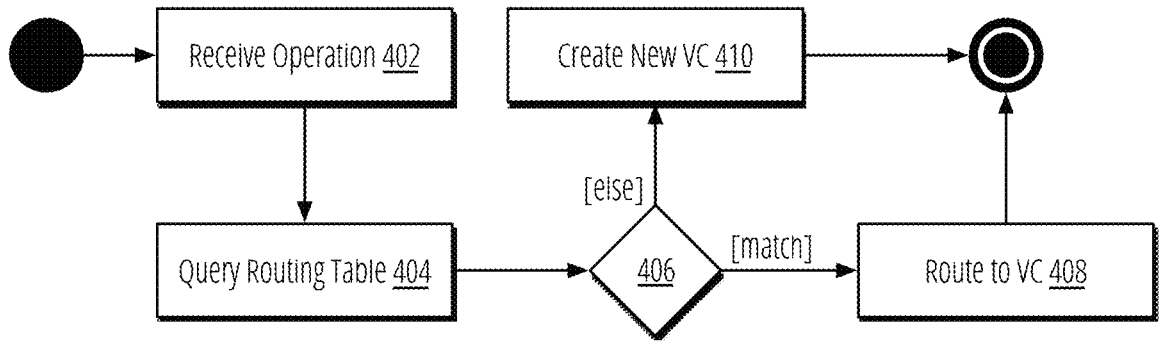
FIG. 4A is a flow diagram illustrating a method for routing operations to a version cache (VC) according to some of the example embodiments.

FIG. 4A is a flow diagram illustrating a method for routing operations to a VC according to some of the example embodiments. In some embodiments, an SMR can execute method 400A.

In step 402, method 400A can include receiving an operation. In some embodiments, the operation can include a version identifier. In some embodiments, the operation can include account, tenant, user, dataset identifier, or other authentication data to identify the data needed to service the operation. In some embodiments, the operation can include a read or write operation identifier. In some embodiments, the operation is received from a user via a front-end application (e.g., sheets subsystem 104 or reports subsystem 106).

In step 404, method 400A can include querying a routing table. In some embodiments, method 400A can maintain a mapping of version and other authentication data to VCs and associated compute nodes. As such, when receiving an operation, method 400A can extract this authentication data and receive a list of one or more compute nodes hosting a matching VC storing the necessary version of a dataset.

In step 406, method 400A can include determining if a matching VC and compute node was found. In some embodiments, a match is found when the routing table matches the authentication data (e.g., tenant, user, etc.) and version identifier. If so, method 400A proceeds to step 408, where the operation is routed to the matching VC and compute node. In some embodiments, if multiple compute nodes or VCs are found (e.g., a compute node and one or more replicas), method 400A can route the operation based on the load of the compute nodes (e.g., selecting the compute node having the lightest load) or in a random or round-robin fashion.

Alternatively, if method 400A determines that no compute node or VC matches the authentication data and version data, method 400A can proceed to step 408. In step 410, method 400A can instantiate a new VC for the version and authentication data. In some embodiments, this process is similar to that described in scaling process 224. Specifically, the latest version data for the dataset is loaded from a data store and a VC is created using this data. An orchestrator can then launch a virtual machine, container, or similar computing device to attach the compute node to the network. In some embodiments, method 400A can further include updating the routing table to reflect the new compute node/VC. In the foregoing manner, VCs can be lazily instantiated based on the status of operations.

Figure 4B:
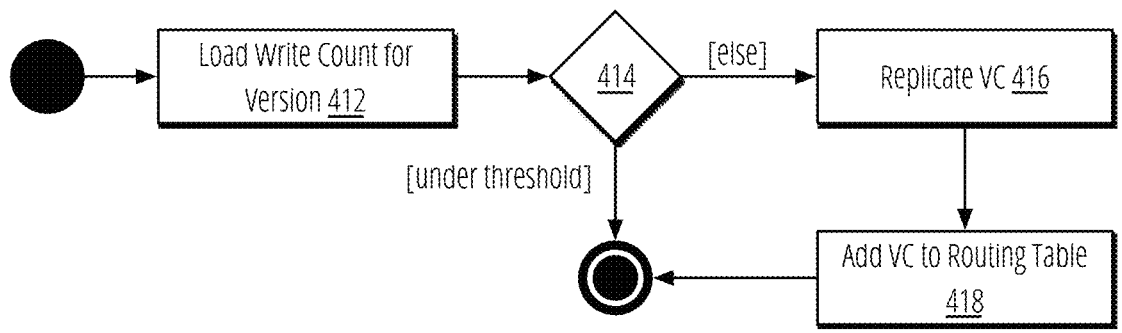
FIG. 4B is a flow diagram illustrating a method for horizontally scaling out compute nodes via a replication process according to some of the example embodiments.

FIG. 4B is a flow diagram illustrating a method for horizontally scaling out compute nodes via a replication process according to some of the example embodiments.

In step 412, method 400B can include loading a write count for a given version. In some embodiments, a write count comprises a number of write operations occurring during a set interval (e.g., the last ten minutes) across all compute nodes/VCs hosting a given version. In some embodiments, the SMR can manage write counts for each version. Specifically, in some embodiments, the SMR can maintain a write counter that is continuously updated as write operations are received and periodically reset based on the interval.

In step 414, method 400B determines if the write count exceeds a threshold. In some embodiments, the threshold can be manually configured or set automatically and represents a triggering threshold in which VCs for a version will be replicated. As illustrated, if the write count for a given version is below the threshold, method 400B ends and takes no further action. In some embodiments, each version can be periodically checked using method 400B. In other embodiments, method 400B can be run for each write operation by identifying the target version and determining if a VC for the identified version should be replicated. As illustrated, if the write count for a given version exceeds the threshold, method 400B proceeds to step 416.

In step 416, method 400B can include replicating a VC for the version. Details of replication were provided in the description of step 404 and are not repeated herein. In brief, method 400B can either duplicate an existing VC in a new compute node (or existing compute node) or can instantiate a new VC based on the latest state of the version of data backing the current version. In some embodiments, when deciding to create a new replica of a VC on a compute node, the chosen compute node can be one already up and running in the system, or depending on the overall system load, a new compute node can be created and added to the set of running compute nodes. In this manner, a system can only replicate VCs that are experiencing heavy write volumes. Because read-only or read-mostly workloads benefit less from horizontal scaling, the decision to scale out is thus mindful of the operation types (read versus write) that are happening on the VC. If enough write operations happen within some interval, a scale-out operation is initiated, and a new compute node is chosen to host the VC.

In step 418, method 400B can include adding the new compute node/VC to the routing table of the SMR. Details of the routing table have been described previously and are not repeated herein. In brief, step 418 includes adding the new compute node/VC to the routing table such that future operations involving the version of data stored by the VC can be routed accordingly. In some embodiments, users requesting access to the VC that do not yet have affinity with some compute node (i.e., have not issued requests to a VC yet), may be routed to the newly created compute node to perform the operation.

Figure 4C:
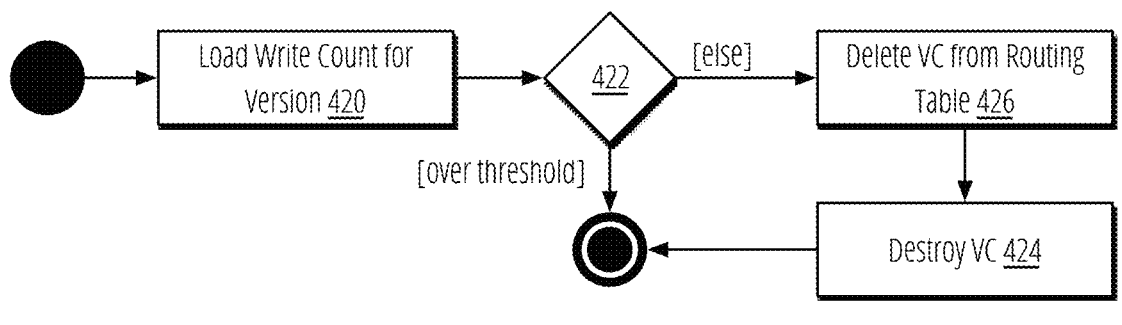
FIG. 4C is a flow diagram illustrating a method for horizontally scaling down compute nodes via a replication process according to some of the example embodiments.

FIG. 4C is a flow diagram illustrating a method for horizontally scaling down compute nodes via a replication process according to some of the example embodiments.

In step 420, method 400C can include loading a write count for a given version. In some embodiments, a write count comprises a number of write operations occurring during a set interval (e.g., the last ten minutes) across all compute nodes/VCs hosting a given version. In some embodiments, the SMR can manage write counts for each version. Specifically, in some embodiments, the SMR can maintain a write counter that is continuously updated as write operations are received and periodically reset based on the interval.

In step 422, method 400C determines if the write count exceeds a threshold. In some embodiments, the threshold can be manually configured or set automatically and represents a triggering threshold in which VCs for a version should be scaled down. As illustrated, if the write count for a given version falls below the threshold, method 400C ends and takes no further action. In some embodiments, the SMR can periodically check each version using method 400C. In other embodiments, method 400C can be run for each write operation by identifying the target version (e.g., identified using method 400A) and determining if a VC for the identified version should be replicated. As illustrated, if the write count for a given version falls below the threshold, method 400C proceeds to step 426.

In step 426, method 400C can including deleting the VC from a routing table. Details of the routing table have been described previously and are not repeated herein. In brief, step 426 includes removing the compute node/VC from the routing table such that future operations involving the version of data stored by the VC can be routed accordingly. Since the threshold represents a minimum number of writes, VCs that are not handling many writes can be "condensed" into other existing VCs to reduce the overhead of the system. Future requests will thus no longer be routed to the deleted VC.

In step 424, method 400C can include destroying the VC and compute node deleted from the routing table. In an embodiment, an SMR can issue a command to the orchestrator to destroy the compute node hosting the VC.

In the illustrated embodiment, to efficiently utilize compute resources (e.g., the population of all compute nodes), the system scales down as the load decreases for a given version. In the same way in which the router scales out if the number of write requests in some interval is beyond some threshold (in FIG. 4B), the system can scale down if the number of write requests falls below some threshold in a given interval. To scale down, the router chooses some compute node from the N compute nodes that is hosting a given version and removes an entry in the routing table indicating that the compute node is hosting the version in question. It then sends a message to the compute node instructing it to remove the VC from memory associated with the version. As part of this scale-down mechanism we can decide, based on the overall system load, to also reduce the number of compute nodes the system.

In the foregoing methods (method 400A, method 400B, method 400C), VCs can be scaled out and down as needed. The goal of scaling out by having a given version hosted on multiple compute nodes is to support a higher level of concurrency. This means more users can use the system at the same time with the response times remaining the same. Theoretically, moving from one compute node to two compute nodes double the number of supported users with the response time remaining constant. However, because the compute nodes need to synchronize such that the write requests that happen on other compute nodes need to be replayed on this compute node, the ideal double in improvement is not always met. However, the expected increase in concurrency can be predicted by making a few basic assumptions. That is, the number of users overall that can be supported with the same response time can be represented as:

$$BD + (P-1)BRD = B \quad \text{Equation 1}$$
$$BD(1 + (P-1)R) = B$$
$$D(1 + (P-1)R) = 1$$
$$D = \frac{1}{1 + (P-1)R}$$
$$N = \frac{PB}{1 + (P-1)R}, \text{ since } N = PBD$$

In Equation 1, P represents the number of compute nodes in the system, B represents a baseline number of users for a single compute node (e.g., a single compute node can support 500 users with a one second average response time), R represents the synchronization merge ratio (i.e., the average number of writes that are merged/batched and applied using a single write lock during each iteration of the synchronization process), D represents the decrement percentage (i.e., the value that is deducted from the baseline to account for the additional work of synchronization. Note that the decrement percentage will drop the baseline number of users for a given compute node from B to BD, the new per-compute node baseline), and N represents the new baseline number of users overall that can be supported with the same response time; by definition, N=PBD.

For example, assuming that one eval compute node can support a baseline of 500 users (B=500) with one second response time and a synchronization merge ratio of 1/10 (R=0.1). Each time a synchronization event happens, approximately 10 writes are applied to the VC using a single write lock get operation. The expected new baseline number for three (P=3) compute nodes would be:

$$N = \frac{(3)(500)}{1 + (3+1)(0.1)} = 1,250$$

Thus, using three compute nodes, the system can expect to service 1,250 concurrent users with the same average one second response time.

Figure 5:
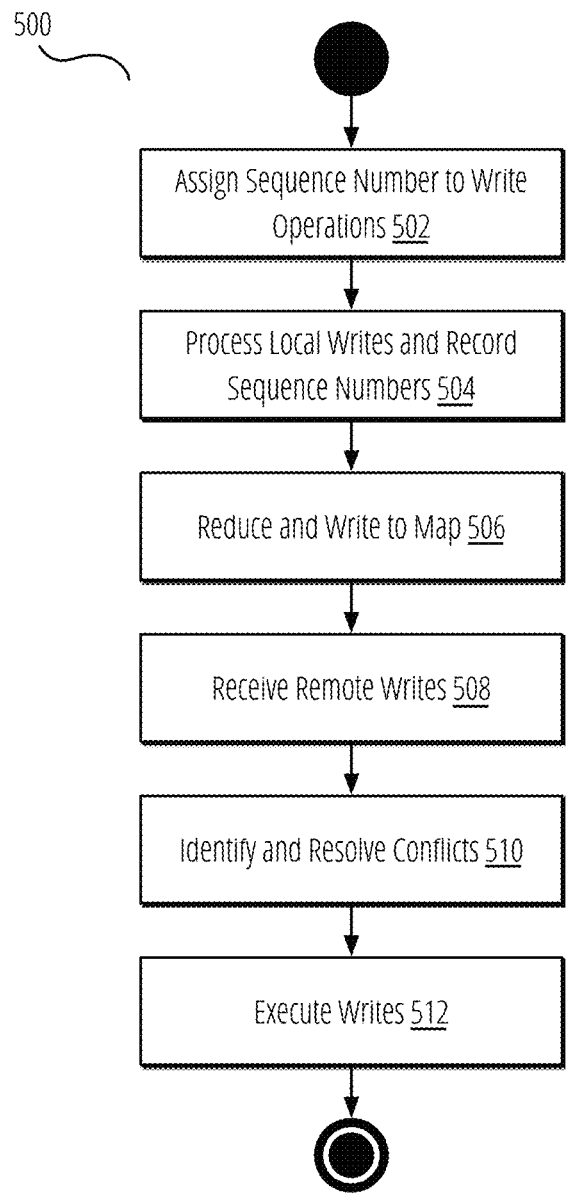
FIG. 5 is a flow diagram illustrating a method for resolving write conflicts according to some of the example embodiments.

FIG. 5 is a flow diagram illustrating a method for resolving write conflicts according to some of the example embodiments.

In the various embodiments describe above, writes may not necessarily be seen in the same order by each user on a given compute node. Specifically, whereas writes that happen natively on a given compute node are seen immediately by all users on that compute node, writes that happen on other compute nodes are not visible until the next synchronization occurs (as discussed in FIG. 3). Thus, User A on Compute node 1 may see writes in the order of W1 then W2, whereas User B on Compute node 2 may see the writes in the order of W2 then W1.

In some embodiments, seeing writes in different orders is permissible in the consistent snapshot scheme provided a given user's "snapshot" contains either the complete result of the write or not, and not a mixture of partial writes. As mentioned previously, the MRSW algorithm supports this by ensuring no read transaction happens while a write is being applied and all writes are applied to completion before releasing the write lock.

The example embodiments augment the MRSW algorithm by adding to snapshot consistency rules the notion that users will always see a consistent, committed, state. To achieve a consistent committed state, the example embodiments enforce the provision that no user should see older data after seeing newer data. In the example above, as long as the locations of W1 and W2 refer to different locations, seeing the writes in any order does not violate the provision. Thus, a user can see the following orders ((W1 only), (W2 only), (W1 then W2), (W2 then W1) and still see a consistent committed state. Each user can see a different state than another user, however, the state each user sees is consistent provided W1 and W2 refer to different locations. If, however, W1 and W2 refer to the same location, a user who sees W2 and then W1 would see an incorrect result. Namely, they would see newer data and would later see the older data. The illustrated method 500 remedies this by identifying conflicts between an ordered set of deltas and a locally stored set of write operations.

In step 502, method 500 can include assigning sequence numbers to write operations (e.g., deltas). In some embodiments, step 502 is performed by a data store which assigned incrementing, sequential identifiers for each write operations received from the compute nodes. Thus, the data store can ensure that each write, regardless of compute node, is assigned a global ordering identifier for consistent ordering. In some embodiments, the data store can assign the sequence number prior to committing the write to the data store, thus ensuring that the ordering of sequence number matches the operations performed on the canonical data store. In this way, even though writes are happening in parallel on different compute nodes, at the data store, they are serialized to the extent that a write that is assigned seqNo=N is applied to the data store and committed before a write with seqNo=N+1. In other words, all updates are sequentialized that the data store layer to provide a globally unique order of all updates.

In step 504, method 500 can include processing local write operations and recording sequence numbers.

In an embodiment, local write operations refer to those write operations received by a compute node (as compared to write operations performed by another compute node). As discussed previously with respect to FIG. 2, a compute node will execute a local write to its VC and then (or in parallel) transmit the write operation to the data store for committing. Details of executing a write operation on a VC were described previously and are not repeated herein. In some embodiments, step 504 can include executing the write operation on the VC, transmitting the write operation to the data store, receiving a sequence number from the data store, and recording in the memory of the VC, the sequence number of the write and the locations that are changed.

In step 506, method 500 can include reducing the local write operations and writing the reduced write operations to a map.

In some embodiments, write operations can write and overwrite locations in memory at different sequence numbers. For example, assume two native writes are applied to the VC. The first write contains locations $L_i$ and $L_j$ and is assigned sequence number m. The second write contains locations $L_j$ and $L_k$ and is assigned sequence number o, such that, temporally, o>m. In this example, the location $L_j$ is written in sequence number m and then overwritten in sequence number o. As such, these two writes can be reduced to the later of the writes.

In an embodiment, method 500 can record these changes in the VC in a mapping data structure that maps a given location to the greatest sequence number that has been applied. In the previous example, such a map may appear as follows:

$L_i \rightarrow m$ $L_j \rightarrow o$ $L_k \rightarrow o$

In step 508, method 500 can include receiving remote writes. In an embodiment, the remote writes can comprise a log of deltas, as described previously, from a log (e.g., PRL).

In step 510, method 500 can include identifying conflicts between the remote writes and the local writes. In step 512, method 500 can include executing any remote writes that either do not conflict with a local write or override a local write. Although illustrated sequentially, in some embodiments (discussed in the example), step 510 and step 512 can be for each write in order (e.g., in parallel).

During the synchronization process as writes from other compute nodes are applied to the compute node executing method 500, method 500 can identify cases in which the same location (in both local and remote writes) has been modified and the modification by the remote write is older (e.g., has a lower sequence number) than a location that has recently been updated by a local write.

Continuing the previous example, the following changes happen on another compute node and will be applied in the next synchronization: locations $L_k$, $L_m$, $L_n$ are assigned sequence number n and locations $L_i$, $L_q$ are assigned sequence number o. Again, m<n<o, temporally. In an embodiment, method 500 can sequentially walk through each remote write and query the mapping to determine if a conflict exists. Specifically, in an embodiment, method 500 can determine if any local writes to the same location occurred and then can compare the sequence numbers to order the writes.

For the remote write to $L_k$ at sequence number n, a conflict exists since a local write to $L_k$ exists. Further, since the local write to $L_k$ occurs at sequence number o, method 500 can determine that the local write (which occurs after sequence n), should override the committed remote write. As such, method 500 can discard the remote write to $L_k$ at sequence n and keep the local write to $L_k$ that occurred at sequence o.

Next, for remote write to $L_m$ at sequence number n, no conflict exists since the local writes did not write to $L_m$. Thus, method 500 checks if the mapping includes a write to $L_m$ and upon determining no such write exists, executes the remote write to $L_m$.

Next, for remote write to $L_n$ at sequence number n, no conflict exists since the local writes did not write to $L_n$. Thus, method 500 checks if the mapping includes a write to $L_n$ and upon determining no such write exists, executes the remote write to $L_n$.

Next, for the remote write to $L_i$ at sequence number o, a conflict exists since the local write to $L_i$ has been committed. However, in this scenario the remote write after the local write (o>m). As such, method 500 can execute the remote write to $L_i$ and over write the local write to the same location.

Finally, for remote write to $L_q$ at sequence number o, no conflict exists since the local writes did not write to $L_q$. Thus, method 500 checks if the mapping includes a write to $L_q$ and upon determining no such write exists, executes the remote write to $L_q$. As such, method 500 can ensure that only remote writes that either do not conflict with a local write or override a local write are executed.

In the foregoing embodiments, method 500 stores the complete locations for each remote write which allows method 500 to exactly determine if the same location has changed. However, in an alternative embodiment, method 500 can record less precise information to the benefit of less memory used but to the detriment of being exactly able to determine if the same location has changed. This can be advantageous for many real-world scenarios in which different users are assigned different locations of a dataset to edit (e.g., different organizational levels, territories, etc.) such that no two users are likely to edit the same location.

In this alternative, method 500 can maintain the key dimension values of the changed location and drop those dimension values that are not essential. For example, assume that a time dimension is dropped from a recorded location. Thus, if a write happens at location $(A_i, L_j, P_k, T_l)$ in which $A_i$, $L_j$, $P_k$ are dimension values for Account, Level and Product respectively, and $T_l$ is a value in the time dimension, instead of recording this location in its four-element form, method 500 can instead drop the time dimension and record it in a three-element form of $(A_i, L_j, P_k)$. In this form, it may not be possible to identify which particular time period was modified, however it allows method 500 to record three numbers instead of four and a range of writes to different time periods for the same dimensions gets compressed as well. For example, the set $[(A_i, L_j, P_k, T_l), (A_i, L_j, P_k, T_m), (A_i, L_j, P_k, T_n), \ldots (A_i, L_j, P_k, T_z)]$ can be represented by the single tuple $(A_i, L_j, P_k)$.

In this alternative embodiment, method 500 can be modified such that when a conflict is found in step 510, method 500 may not use the sequence numbers to discard an older change when a newer one has already been applied. Instead, when a conflict is found, method 500 can be changed to discard the VC and load a new one as loading a new VC always captures the latest set of all writes that have been made to the data store (as described in previous embodiments). When conflicts are rare, the alternative embodiment can require less memory and less time to apply the changes during the synchronization process.

Figure 6:
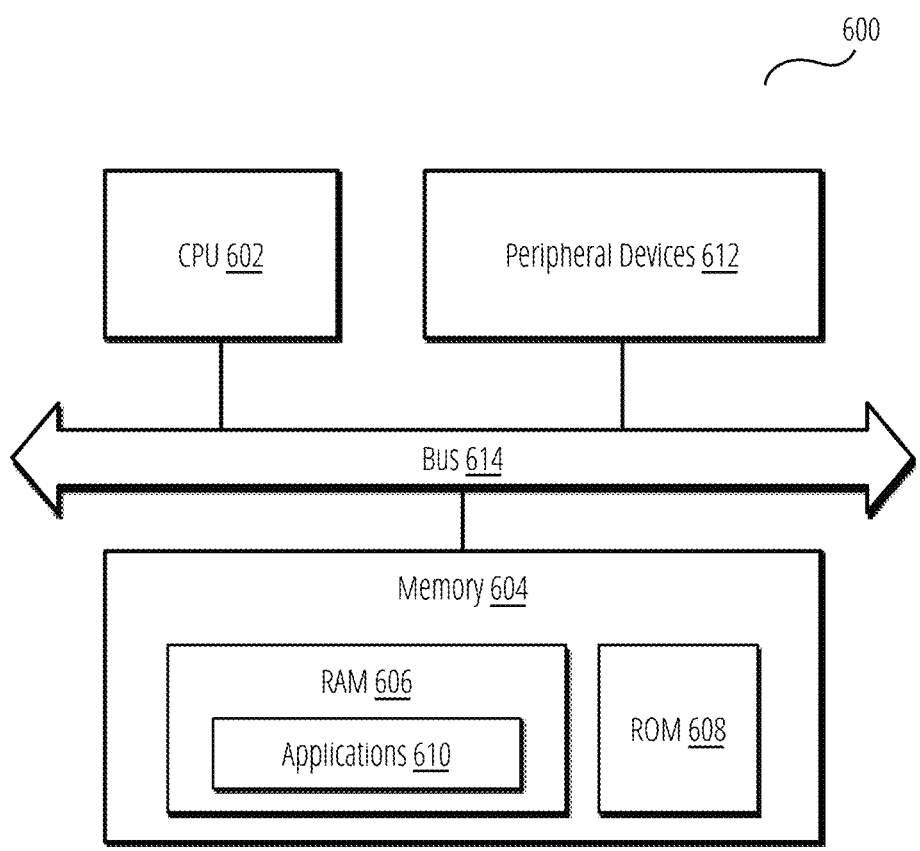
FIG. 6 is a block diagram of a computing device 600 according to some embodiments of the disclosure.

FIG. 6 is a block diagram of a computing device 600 according to some embodiments of the disclosure. In some embodiments, the computing device can be used to perform some of all of the methods described above or implement the components depicted in FIG. 1.

As illustrated, the device includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a non-transitory memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, bus 614 may comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth™, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
replicating a first version cache to generate a replicated first version cache;
receiving a write operation including data at the first version cache;
generating a delta for the write operation representing a change in the data;
writing the delta to a replication log storing an ordered set of deltas including the delta; and
applying the ordered set of deltas at the replicated first version cache.

2. The method of claim 1, wherein applying the ordered set of deltas at the replicated first version cache comprises:
retrieving the ordered set of deltas from the replication log;
obtaining a write lock, the write lock configured to block operations at the replicated first version cache;
applying deltas in the ordered set of deltas, each delta in the ordered set of deltas modifying the data stored by the replicated first version cache; and
releasing the write lock after applying the deltas in the ordered set of deltas.

3. The method of claim 2, further comprising:
determining that a lock grant timer has expired before the write lock is obtained;
creating a new version cache; and
replacing the replicated first version cache with the new version cache.

4. The method of claim 2, further comprising comparing the ordered set of deltas with a locally stored set of write operations to identify conflicts between the ordered set of deltas and the locally stored set of write operations.

5. The method of claim 1, further comprising:
receiving, at a router, an operation, the operation including a version;

determining, by the router, if the version matches a version of the data associated with the first version cache by querying a routing table of version caches;

transmitting, by the router, the operation to the first version cache if the version matches the version of the data associated with the first version cache; and instantiating, by the router, a new version cache if the version does not match the version of the data associated with the first version cache.

6. The method of claim 5, further comprising removing, by the router, a version cache from the routing table of version caches when a number of write operations is below a threshold.

7. The method of claim 1, wherein replicating the first version cache to generate the replicated first version cache comprises replicating the first version cache to generate the replicated first version cache after determining that a number of write operations exceeds a threshold.

8. A non-transitory computer-readable storage medium for tangibly storing computer program instructions capable of being executed by a computer processor, the computer program instructions defining steps of:

replicating a first version cache to generate a replicated first version cache;

receiving a write operation including data at the first version cache;

generating a delta for the write operation representing a change in the data;

writing the delta to a replication log storing an ordered set of deltas including the delta; and applying the ordered set of deltas at the replicated first version cache.

9. The non-transitory computer-readable storage medium of claim 8, wherein applying the ordered set of deltas at the replicated first version cache comprises:

retrieving the ordered set of deltas from the replication log;

obtaining a write lock, the write lock configured to block operations at the replicated first version cache;

applying deltas in the ordered set of deltas, each delta in the ordered set of deltas modifying the data stored by the replicated first version cache; and releasing the write lock after applying the deltas in the ordered set of deltas.

10. The non-transitory computer-readable storage medium of claim 9, further comprising:

determining that a lock grant timer has expired before the write lock is obtained;

creating a new version cache; and replacing the replicated first version cache with the new version cache.

11. The non-transitory computer-readable storage medium of claim 9, further comprising comparing the ordered set of deltas with a locally stored set of write operations to identify conflicts between the ordered set of deltas and the locally stored set of write operations.

12. The non-transitory computer-readable storage medium of claim 8, further comprising:

receiving, at a router, an operation, the operation including a version;

determining, by the router, if the version matches a version of the data associated with the first version cache by querying a routing table of version caches;

transmitting, by the router, the operation to the first version cache if the version matches the version of the data associated with the first version cache; and instantiating, by the router, a new version cache if the version does not match the version of the data associated with the first version cache.

13. The non-transitory computer-readable storage medium of claim 8, wherein replicating the first version cache to generate the replicated first version cache comprises replicating the first version cache to generate the replicated first version cache after determining that a number of write operations exceeds a threshold.

14. The non-transitory computer-readable storage medium of claim 13, further comprising removing a version cache from a routing table of version caches when a number of write operations is below a threshold.

15. A system comprising:

a processor configured to:

replicate a first version cache to generate a replicated first version cache;

receive a write operation including data at the first version cache;

generate a delta for the write operation representing a change in the data;

write the delta to a replication log storing an ordered set of deltas including the delta; and apply the ordered set of deltas at the replicated first version cache.

16. The system of claim 15, wherein applying the ordered set of deltas at the replicated first version cache comprises:

retrieving the ordered set of deltas from the replication log;

obtaining a write lock, the write lock configured to block operations at the replicated first version cache;

applying deltas in the ordered set of deltas, each delta in the ordered set of deltas modifying the data stored by the replicated first version cache; and releasing the write lock after applying the deltas in the ordered set of deltas.

17. The system of claim 16, the processor further configured to:

determine that a lock grant timer has expired before the write lock is obtained;

create a new version cache; and replace the replicated first version cache with the new version cache.

18. The system of claim 15, the processor further configured to:

receive an operation, the operation including a version;

determine if the version matches a version of the data associated with the first version cache by querying a routing table of version caches;

transmit the operation to the first version cache if the version matches the version of the data associated with the first version cache; and instantiate a new version cache if the version does not match the version of the data associated with the first version cache.

19. The system of claim 15, wherein replicating the first version cache to generate the replicated first version cache comprises replicating the first version cache to generate the replicated first version cache after determining that a number of write operations exceeds a threshold.

20. The system of claim 19, the processor further configured to remove a version cache from a routing table of version caches when a number of write operations is below the threshold.

* * * * *